United States Patent [19]
Poindexter

[11] Patent Number: 5,967,736
[45] Date of Patent: Oct. 19, 1999

[54] EQUIPMENT HANDLING DEVICE

[76] Inventor: David A. Poindexter, 708 Patterson St., Stoughton, Wis. 53589

[21] Appl. No.: 08/959,424

[22] Filed: Oct. 28, 1997

[51] Int. Cl.$^6$ .................................................. B65G 67/02
[52] U.S. Cl. ............................................................ 414/549
[58] Field of Search ................................... 414/546, 549, 414/555, 556, 522, 462, 725

[56] References Cited

U.S. PATENT DOCUMENTS

| | | | |
|---|---|---|---|
| 2,911,118 | 11/1959 | Tapp | 414/549 |
| 3,381,835 | 5/1968 | Lee | 214/450 |
| 3,620,391 | 11/1971 | Fujioka | 214/38 A |
| 3,807,592 | 4/1974 | Lynn et al. | 214/450 |
| 4,023,690 | 5/1977 | Goode | 214/146.5 |
| 4,081,095 | 3/1978 | Wilburn et al. | 214/450 |
| 4,251,178 | 2/1981 | Bourgraf et al. | 414/343 |
| 4,278,387 | 7/1981 | Seguela et al. | 414/462 |
| 4,297,071 | 10/1981 | Dunbar | 414/542 |
| 4,354,791 | 10/1982 | Antonellis | 414/462 |
| 4,573,854 | 3/1986 | McFarland | 414/462 |
| 4,621,972 | 11/1986 | Grote | 414/477 |
| 4,647,110 | 3/1987 | McKee | 298/1 |
| 4,728,244 | 3/1988 | Stokkendal | 414/462 |
| 4,778,327 | 10/1988 | Tufenkian et al. | 414/549 X |
| 4,950,123 | 8/1990 | Brockhaus | 414/522 |
| 5,096,361 | 3/1992 | Crawford | 414/462 |
| 5,110,252 | 5/1992 | Aoki | 414/549 |
| 5,454,684 | 10/1995 | Berens | 414/522 |
| 5,618,150 | 4/1997 | Poindexter | 414/477 |
| 5,630,638 | 5/1997 | Hirasawa et al. | 414/549 X |
| 5,651,657 | 7/1997 | Poindexter | 414/541 |

FOREIGN PATENT DOCUMENTS

| | | |
|---|---|---|
| 2619768 | 3/1989 | France . |
| 2105296 | 7/1982 | United Kingdom . |

*Primary Examiner*—David A. Bucci
*Attorney, Agent, or Firm*—Godfrey & Kahn, S.C.

[57] ABSTRACT

A vehicle-based equipment handling device is constructed by installing tracks into the vehicle along which a carriage slides. A yoke is attached to the carriage at pivot points and is caused to pivot by the action of an extension cylinder. The yoke engages the equipment at its approximate center of gravity to allow easier positioning of the equipment. When the yoke has been actuated by the piston to lift the equipment, the carriage slides along the tracks to load the equipment into the vehicle. One particularly useful application of the equipment handling device is as a loading and unloading device for a portable x-ray machine.

6 Claims, 8 Drawing Sheets

FIG_1

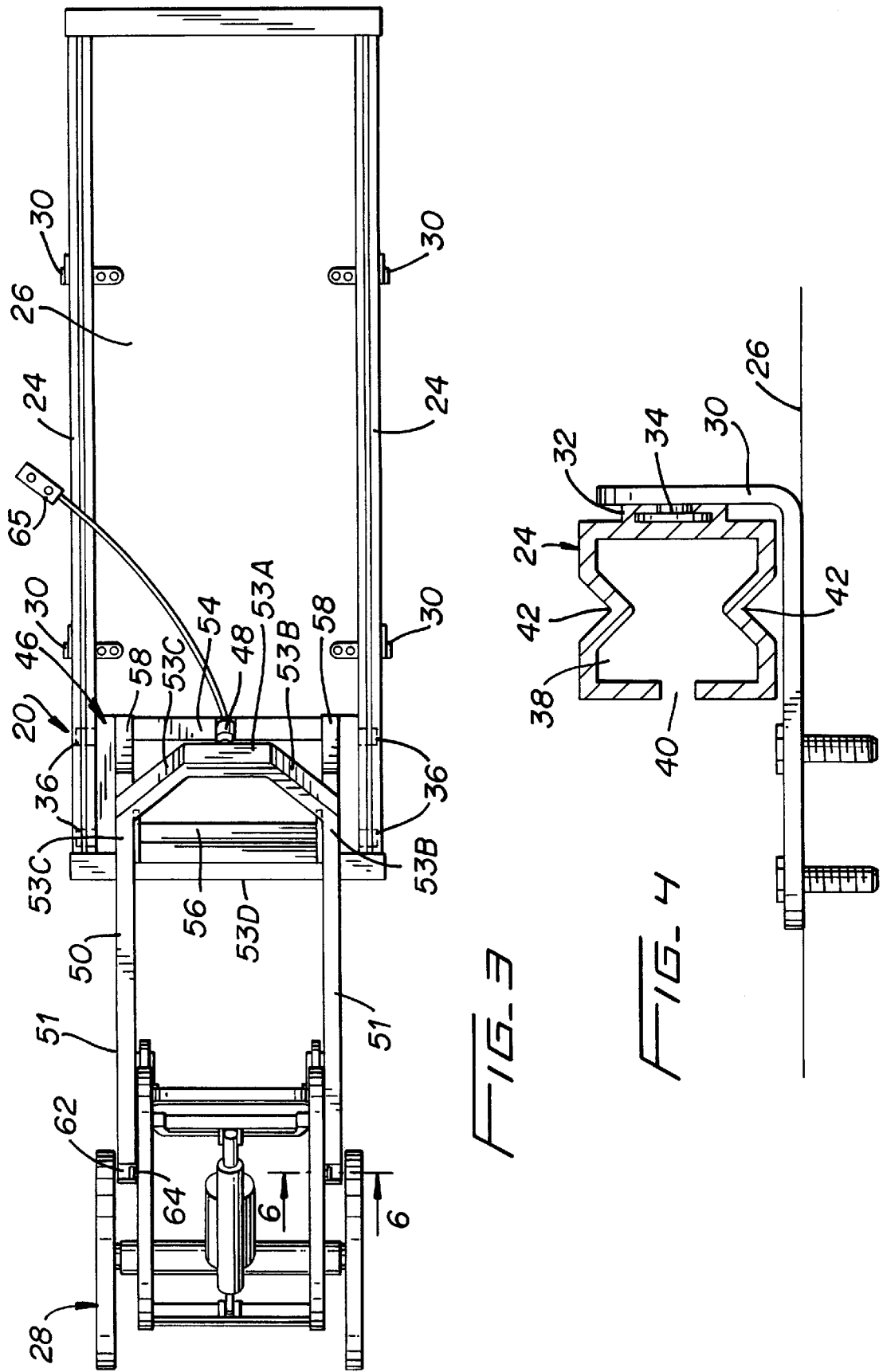

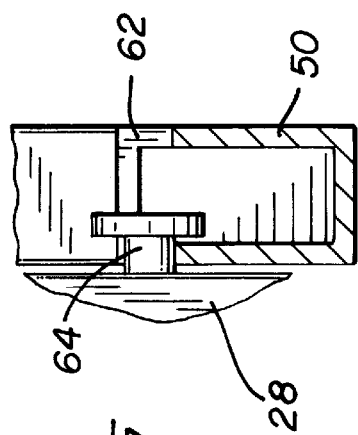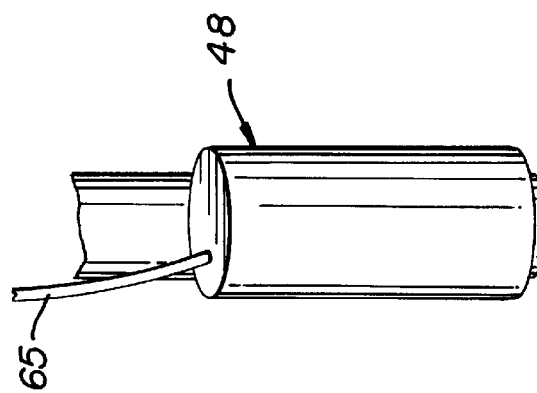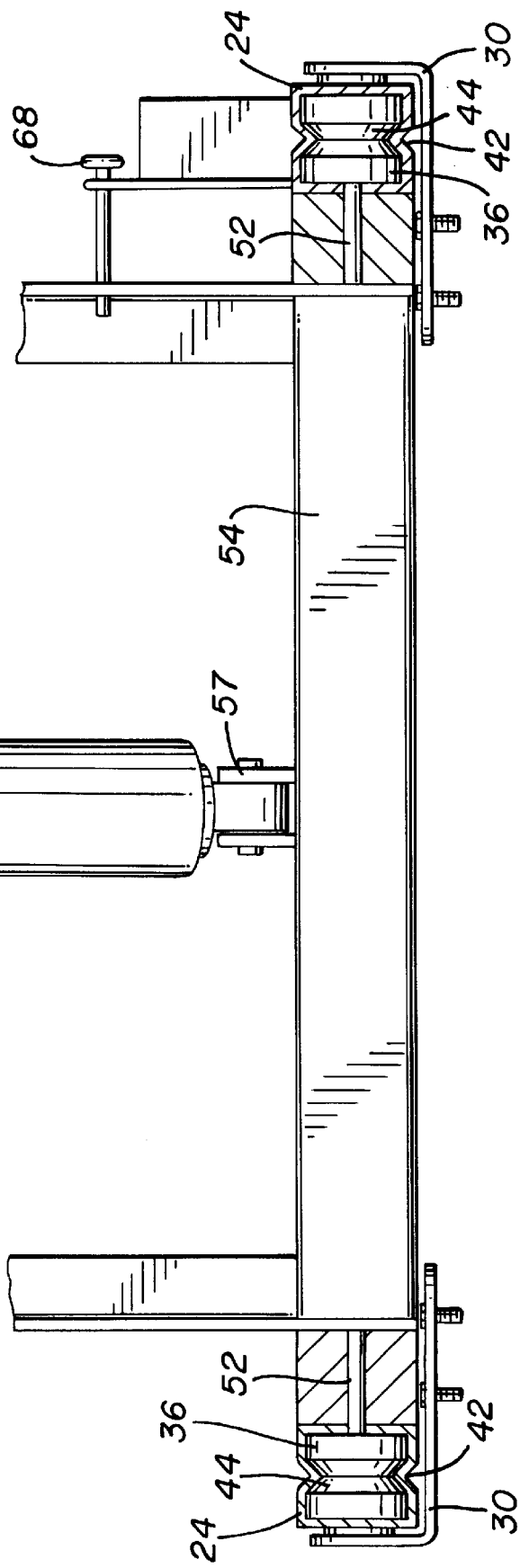

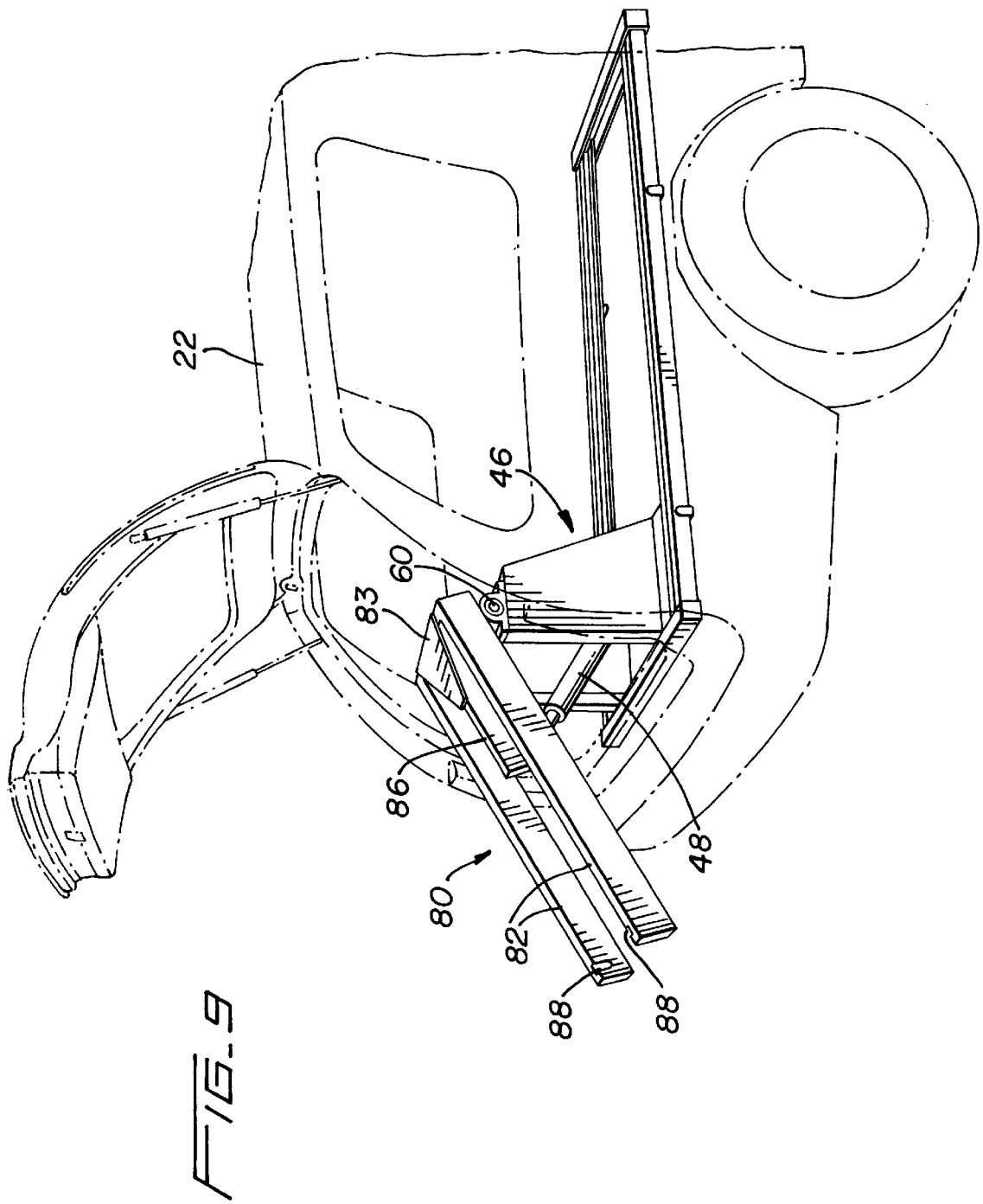

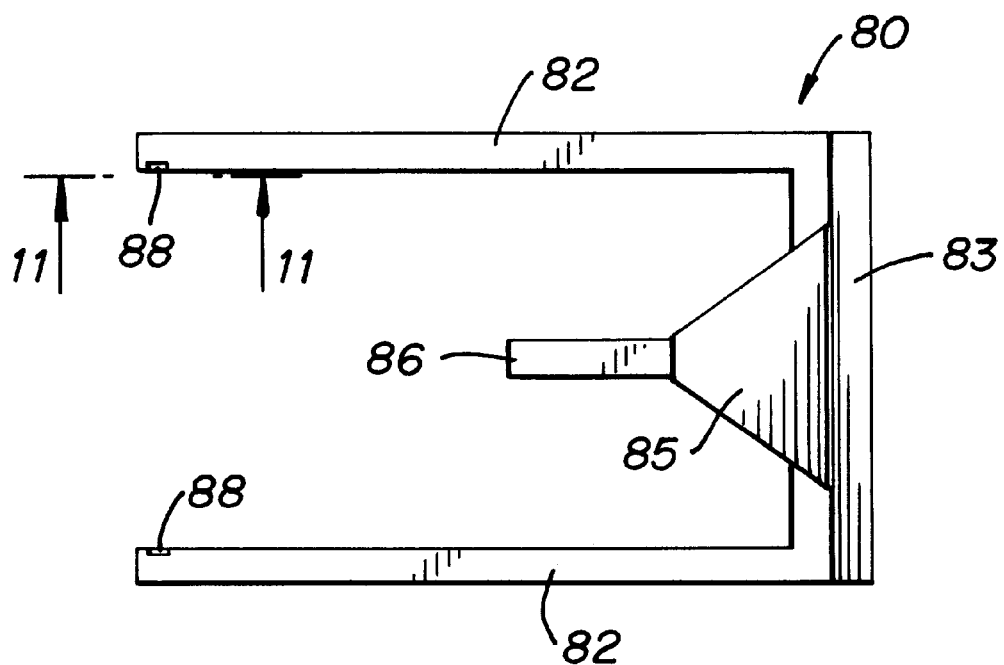
FIG_10
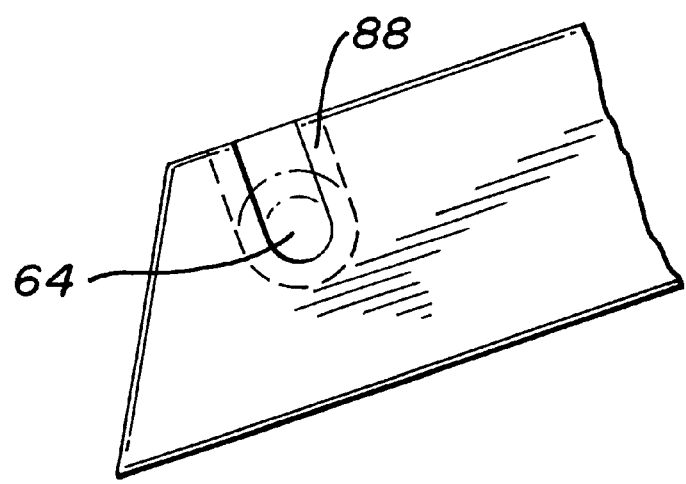
FIG_11

EQUIPMENT HANDLING DEVICE

FIELD OF THE INVENTION

The present invention relates generally to devices for handling small machines or other equipment and, in particular, to a vehicle based portable x-ray machine handling system capable of loading and unloading a portable x-ray machine from a truck, van, station wagon, or other such vehicle.

BACKGROUND OF THE INVENTION

Many devices exist that are adapted to manipulate or otherwise handle cargo that is being loaded or unloaded from vehicles such as trucks, automobiles, and vans. These prior-art devices typically require modification of the vehicle in order to render the device operable for the loading and unloading operation. Typically, modification of the vehicle makes the vehicle less useful for other purposes and often results in an aesthetically unappealing structure. Additionally, such devices are generally rather cumbersome, complex to operate, expensive, and difficult to install and maintain.

Existing devices are particularly unsuitable for loading and unloading relatively bulky, awkwardly weighted, but fragile equipment such as portable x-ray machines or other sensitive medical equipment. Such devices require the operator to be quite strong to manually load or unload the equipment from the vehicle and do not orient the equipment in an appropriate position to facilitate handling and protect the equipment from damage.

Another shortcoming of existing cargo handling devices is that they are not designed to facilitate the loading of relatively tall cargo in a relatively short cargo space. There are many devices, such as portable x-ray machines, which must be transported in a protected cargo area. Any cargo area that provides adequate protection has a hard roof and, necessarily, a limited height. There are numerous devices that are relatively lightweight, but also relatively tall. Generally, vehicles large enough to carry such cargo are large, heavy-duty trucks which are expensive to purchase and operate. Inexpensive, light-duty vehicles such as station wagons are cheap to buy and operate, but lack tall cargo areas. If a device were available that permitted tall cargo to be oriented so as to fit in cargo areas of limited height, large cost savings could be realized.

Accordingly, a need has arisen for an equipment handling device that can load and unload relatively bulky and tall equipment, is easy to operate, protects the equipment from damage, and is easily installed in vehicles.

OBJECTS AND SUMMARY OF THE INVENTION

Therefore, it is an object of the present invention to provide an equipment handling device that is capable of loading and unloading relatively tall equipment from vehicles.

It is a further object of the present invention to provide an equipment handling device that is easy to operate and does not require a great deal of physical strength to operate.

An additional object of the present invention is to provide an equipment handling device that can be readily installed in vehicles without substantial modification to the vehicle.

Another object of the present invention is to provide an equipment handling device capable of loading and unloading relatively bulky, but sensitive equipment from vehicles and protecting the equipment from damage during the process.

A further object of the present invention is to provide an equipment handling device that can be sold, installed, and maintained at a relatively low cost.

The present invention provides the above identified and many additional objects by providing an equipment handling device that engages the equipment at the equipment's approximate center of gravity, lifts the equipment to the appropriate level for loading the vehicle, allows the equipment to be rotated to an optimal transportation position, and loads the equipment into the vehicle.

While the equipment handling device of the present invention may be used with a wide variety of equipment, use of the invention in conjunction with loading and unloading portable x-ray machines from vehicles is one particularly useful application of the device. Thus, references made herein to use of the invention in conjunction with portable x-ray machines are for illustrative purposes only and the invention should not be limited to such an application.

The present invention consists of two channeled tracks releasably mounted within the vehicle in which the equipment will be transported. The tracks are shaped such that a carriage can be slidably mounted therein and restrained from lifting out of the tracks. A yoke is pivotably mounted to the carriage and acts as a lever to lift or lower the equipment when a piston attached to the yoke and carriage is activated. The yoke pivotably engages the equipment approximately at the equipment's center of gravity to allow easier positioning of the equipment in the vehicle.

In loading the equipment, the arms of the yoke are lowered such that they engage pivot points on the equipment. The piston is then activated, thereby raising the yoke holding the piece of equipment. When the yoke is fully raised, the equipment can be rotated to the optimal transport position depending on the size and shape of the equipment and the size of the vehicle into which the equipment is loaded. This ability to rotate the equipment allows taller cargo to be easily loaded into a shorter vehicle such as a station wagon. The carriage is then slid into the vehicle and locked into position. The arms may then be lowered to position the equipment for transport.

These are just some of the features and advantages of the present invention. Many others will become apparent by reference to the detailed description of the invention taken in combination with the accompanying drawings.

DESCRIPTION OF THE DRAWINGS

FIG. 3 is top plan view of an equipment handling device in accordance with the present invention.

FIG. 4 is a cross-section detail of one of the tracks shown in FIG. 3 taken generally along the line 4—4 of FIG. 2.

FIG. 5 is a partial cross-section of the equipment handling device shown in FIG. 3 taken generally along the line 5—5 of FIG. 2.

FIG. 6 is a partial cross-section of the yoke of the equipment handling device shown in FIG. 3 taken generally along the line 6—6 of FIG. 3.

FIG. 9 is a perspective view of one alternative embodiment of the equipment handling device of the present invention installed in a vehicle shown in phantom.

FIG. 10 is a top plan view of the yoke used in conjunction with the alternative embodiment of the invention shown in FIG. 9.

FIG. 11 is a partially transparent detail of the yoke shown in FIG. 10.

DESCRIPTION OF THE PREFERRED EMBODIMENTS

Figure 1:
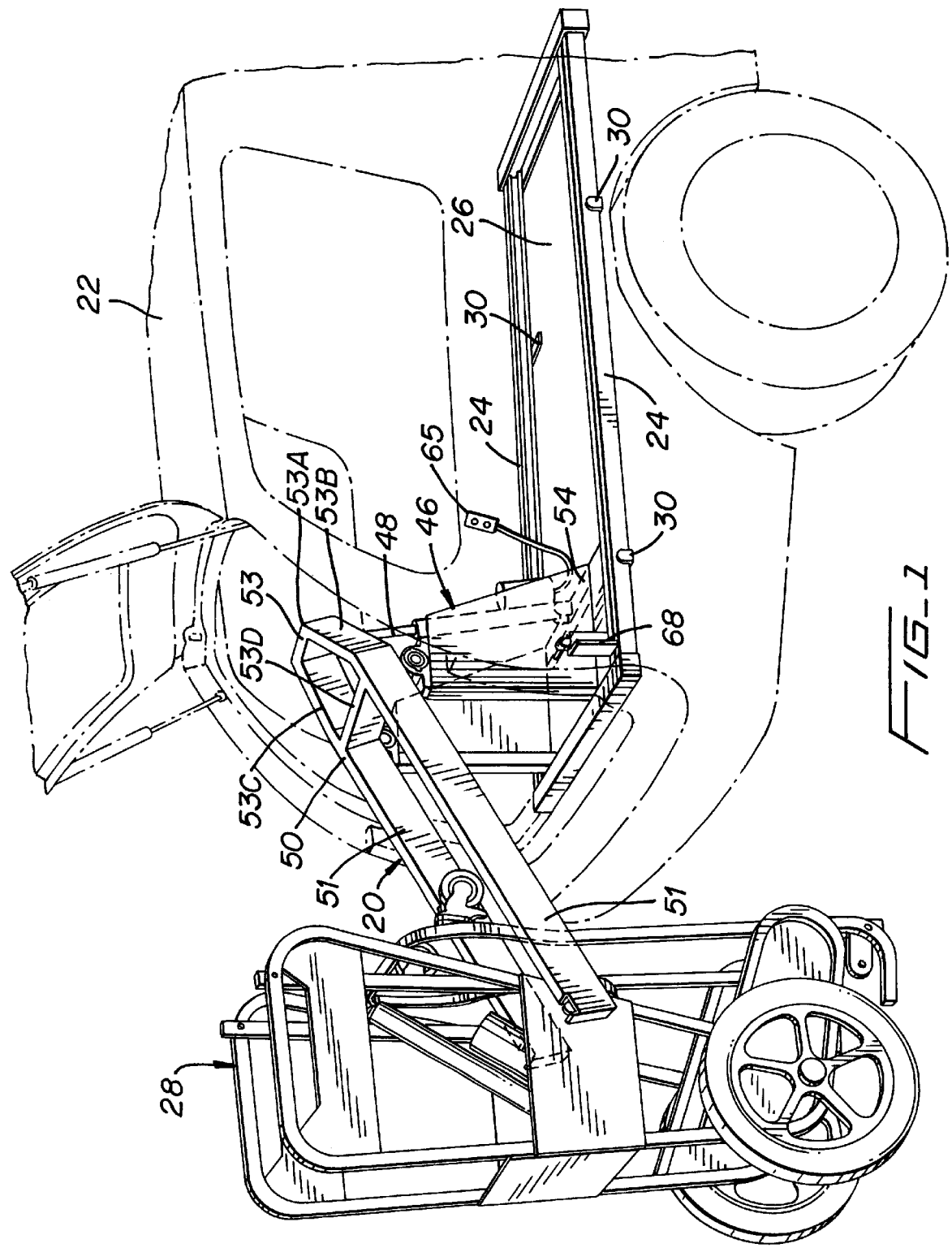
FIG. 1 is a perspective view of an equipment handling device in accordance with the present invention installed in a vehicle shown in phantom.
Figure 2:
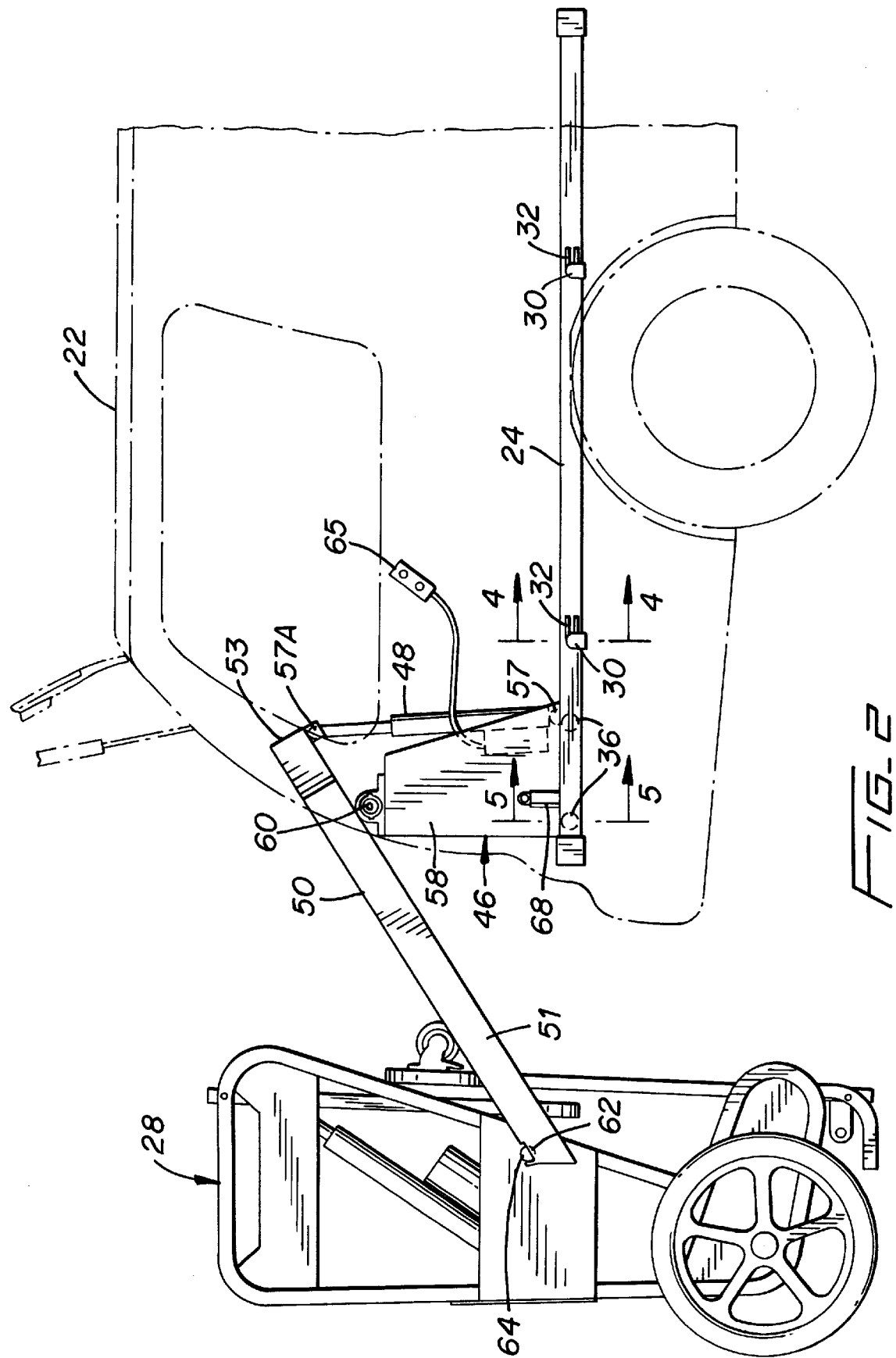
FIG. 2 is a side elevational view of an equipment handling device in accordance with the present invention installed in a vehicle shown in phantom.

The equipment handling device 20 of the present invention is shown generally in FIGS. 1 and 2. While the embodiments of the present invention herein shown and described are particularly useful in combination with a vehicle 22 such as a station wagon (shown in phantom), the equipment handling device 20 may be useful in trucks, buses, or other vehicles. Additionally, while the equipment being unloaded is shown in the drawings as a portable x-ray machine, it will be understood by one of ordinary skill in the art that the invention can be used with a wide variety of equipment, machines, and cargoes.

Channel tracks 24 are releasably secured to the floor 26 of vehicle 22, along which tracks a carriage 46 slides to position a piece of equipment 28 for transport. Tracks 24 may be formed from extruded aluminum or other sufficiently rigid and strong material. It is preferable that the tracks 24 are secured to the floor 26 using attaching devices that do not substantially interfere with other uses of the vehicle 22. The attaching device must be capable of securing the tracks 24 sufficiently that they do not significantly move in response to loads imposed on them. In the preferred embodiment, shown in detail in FIGS. 3 and 4, the attaching devices comprise angle brackets 30 which are secured to the floor of the vehicle 22 by suitable means such as screws 31. The angle brackets 30 engage the tracks 24 such that the tracks 24 are adequately secured, but also such that the tracks 24 can be removed if the vehicle 22 is not being used to transport equipment 28. To form this secure but removable engagement, the tracks 24 have slots 32 into which tabs 34 extending from the brackets 30 are inserted. Thus, the tracks 24 can be removed from the vehicle 22 to allow the vehicle to be used for purposes other than carrying the equipment 28.

Preferably, the tracks 24 have a generally C-shaped cross-section as shown in FIGS. 4 and 5. The tracks 24 have slots 32 as previously described, an interior portion 38 for accepting one or more wheels 36, and an axle slot 40. The interior portion 38 may have one or more stability enhancing indentations 42 to assist in securing the wheel 36 within the track 24. If the track has such an indentation 42, the wheel has a corresponding engagement groove 44 which is generally V-shaped. Such a cross-section, coupled with a corresponding wheel 36 shape, provides additional stability and support helpful in enabling the carriage 46 to slide along the tracks 24 while carrying a piece of equipment 28 by preventing or reducing lateral play of the wheels 36 within the track 24. The wheels 36 are also sized and shaped so that there is only a small gap between the surface of the wheels 36 and the interior of the tracks 24. Of course, other track 24 cross-sections may be effective in securing the wheels 36 and the present invention is not limited to the shape as shown in FIGS. 4 and 5.

Referring now to FIGS. 2 and 3, the equipment handling device 20 itself includes a carriage 46, an extension cylinder 48 and a yoke 50. The carriage 46 slides along the length of the tracks 24 on the wheels 36 which are rotatably attached to the carriage 46 by axles 52 (FIG. 5). The wheels 36 must engage the tracks 24 such that they maintain engagement with the track 24 when a lifting force is applied to the wheels 36 and may be formed from plastic, metal or other material capable of withstanding such force. The axles 52 pass through the axle slot 40 as the wheels 36 and carriage 46 slide along the tracks 24. The carriage 46 itself may be formed from a wide variety of members made from a variety of materials but, in the preferred embodiment, the carriage 46 is formed by a front stabilizer bar 54 and a rear stabilizer bar 56 that connect two upright supports 58 topped by at least one pivot coupling 60. The carriage 46 preferably has four wheels 36 for engaging the tracks 24, a forward wheel and a rearward wheel on the bottom end of each of the two upright supports 58. The pivot coupling 60 on top of the upright supports 58 acts as a fulcrum to pivotably connect the yoke 50 to the carriage 46. The upright supports should be dimensioned to position the pivot coupling 60 sufficiently distant from the floor 26 of the vehicle 22 such that the yoke 50 can adequately raise the equipment 28 over any bumpers or other structure on the vehicle 22. However, the upright supports 58 should not be so tall that the interior ceiling of the vehicle 22 interferes with the loading of the equipment 28. Preferably, the pivot coupling 60 is positioned from 2" to 30" inches above the floor of the cargo area in the vehicle 22. In the preferred embodiment, the upright supports have a wider bottom than top and the wheels 36 are spaced on the bottom widely apart to provide a more stable support base.

The extension cylinder 48 is preferably a fluid-operated linear actuator such as a hydraulic cylinder or a pneumatic cylinder, or an electrically operated linear actuator. One end of the extension cylinder 48 connects to the front stabilizer bar 54 and the other end connects to the yoke 50. The pivotable connection 57 between the front stabilizer 54 and the extension cylinder 48 is shown in greater detail in FIG. 5. A similar pivotable connection 57A may be used to pivotably connect the other end of the extension cylinder 48 to the yoke 50.

The yoke 50 may be formed from extruded aluminum segments arranged in a variety of manners. Of course, other materials having sufficient strength and rigidity may also be used. In the preferred embodiment, the yoke 50 has two substantially parallel arms 51 connected by a head 53. The head 53 is formed from several segments including a middle segment 53A pivotably attached to the extension cylinder 48 and two leg segments 53B and 53C and a cross piece 53D attached to the pivot coupling 60. Extending downward under the cross piece 53D are two oppositely positioned tabs 53E (FIG. 7) each having a bore (not shown). Many other arrangements of segments may be used to form the yoke 50 including the use of a solid head (not shown). However, as it is one of the objects of the invention to provide an equipment handling device 20 capable of being installed in an ordinary vehicle 22, the overall weight of the device is one of the primary considerations in selecting appropriate materials to construct the yoke 50, carriage 46, and tracks 24.

In the preferred embodiment, the yoke 50 acts as a first class lever to raise the equipment 28. The portion of the yoke 50 that engages the equipment 28 is the load portion, the pivotable engagement between the carriage 46 and the yoke 50 at the pivot coupling 60 is the fulcrum, and the place where the extension cylinder connects to the yoke 50 is the effort portion. Other arrangements of the load, effort, and fulcrum are possible, one of which is described in detail below.

In the preferred embodiment, the pivot coupling 60 connecting the yoke 50 to the carriage 46 is formed by a gudgeon or socket 61A (FIG. 7) on top of each upright support 58 interacting with pins 61B placed through the bores in the tabs 53E. The pins 61B extending through the tabs 53E from the yoke 50 and are inserted in the gudgeons 61A.

FIGS. 6 and 11 provide detailed views of the grooves 62 on the ends of each arm 51 of the yoke 50 into which lifting nubs 64 on the equipment 28 are inserted. The grooves 62 are formed in the ends of the arms 51 or the yoke 50 and are dimensioned to receive and support the lifting nubs 64 on the equipment 28. The lifting nubs 64 are located at the approximate center of gravity of the equipment 28 to allow easy rotation of the equipment 28 around its center of gravity after the yoke 50 has raised the equipment 28. This allows for optimal positioning of the equipment 28 for transporting.

A controller 65 (FIGS. 1–3) is used to control the extension of the extension cylinder 48. The extension cylinder 48 may be pneumatically, hydraulically, or electrically operated and must be capable of providing sufficient force to the yoke 50 to raise the equipment 28. The exact capabilities required of the extension cylinder 48 depend on the dimensions of the yoke 50 and the weight of the equipment 28 being lifted. However, it has been found that the extension cylinder 48 should have a 1000 lb. rating. The preferred extension cylinder 48 is electrically operated and is supplied with electricity from the battery of the vehicle 22. One such extension cylinder 48 capable of being used in the invention is the eight inch actuator, Model #D12-20B5-08 manufactured by Warner Electric which is capable of exerting 1000 lbs of force.

Figure 7:
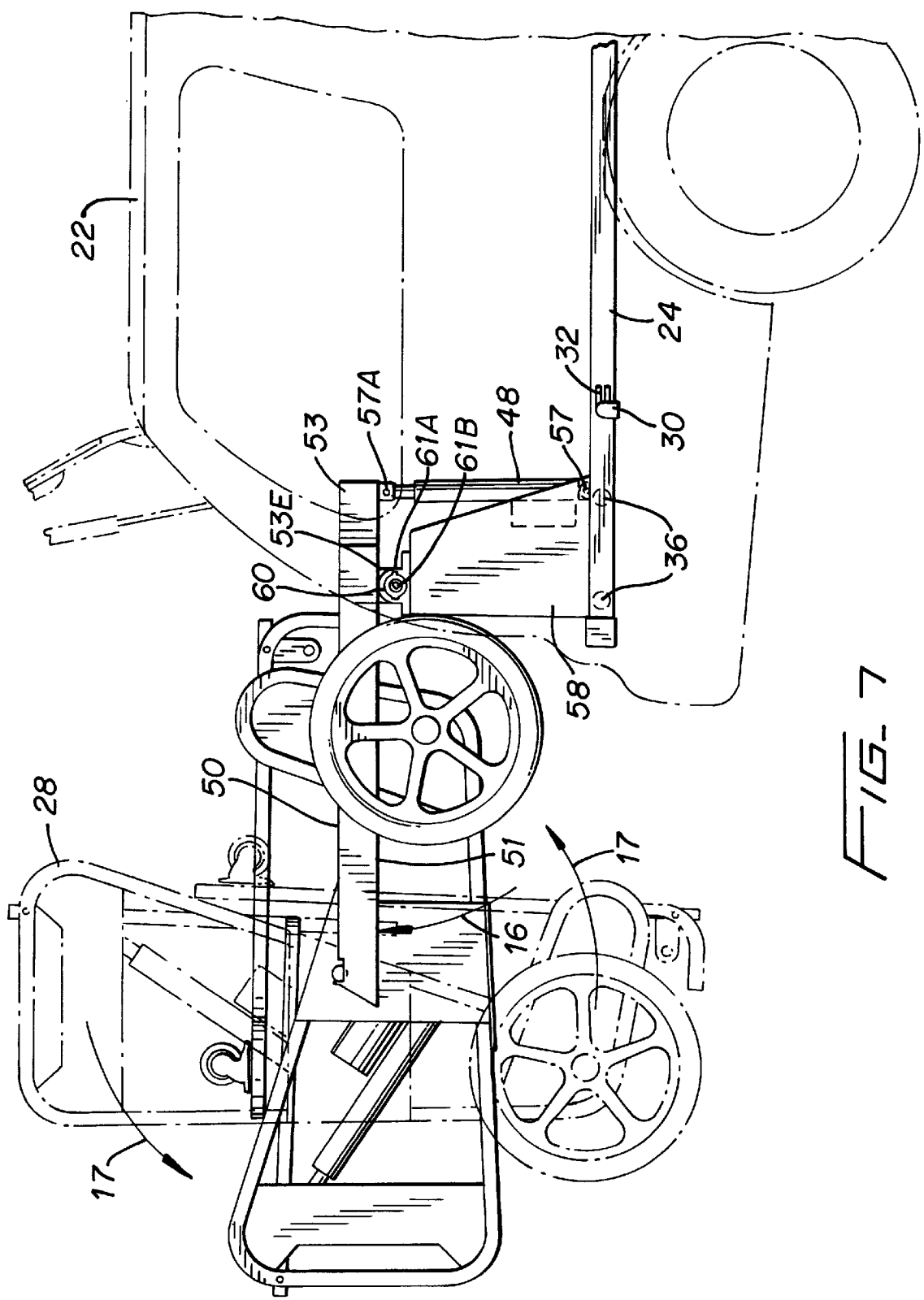
FIG. 7 is a side elevational view of an equipment handling device in accordance with the present invention installed in a vehicle shown in phantom.
Figure 8:
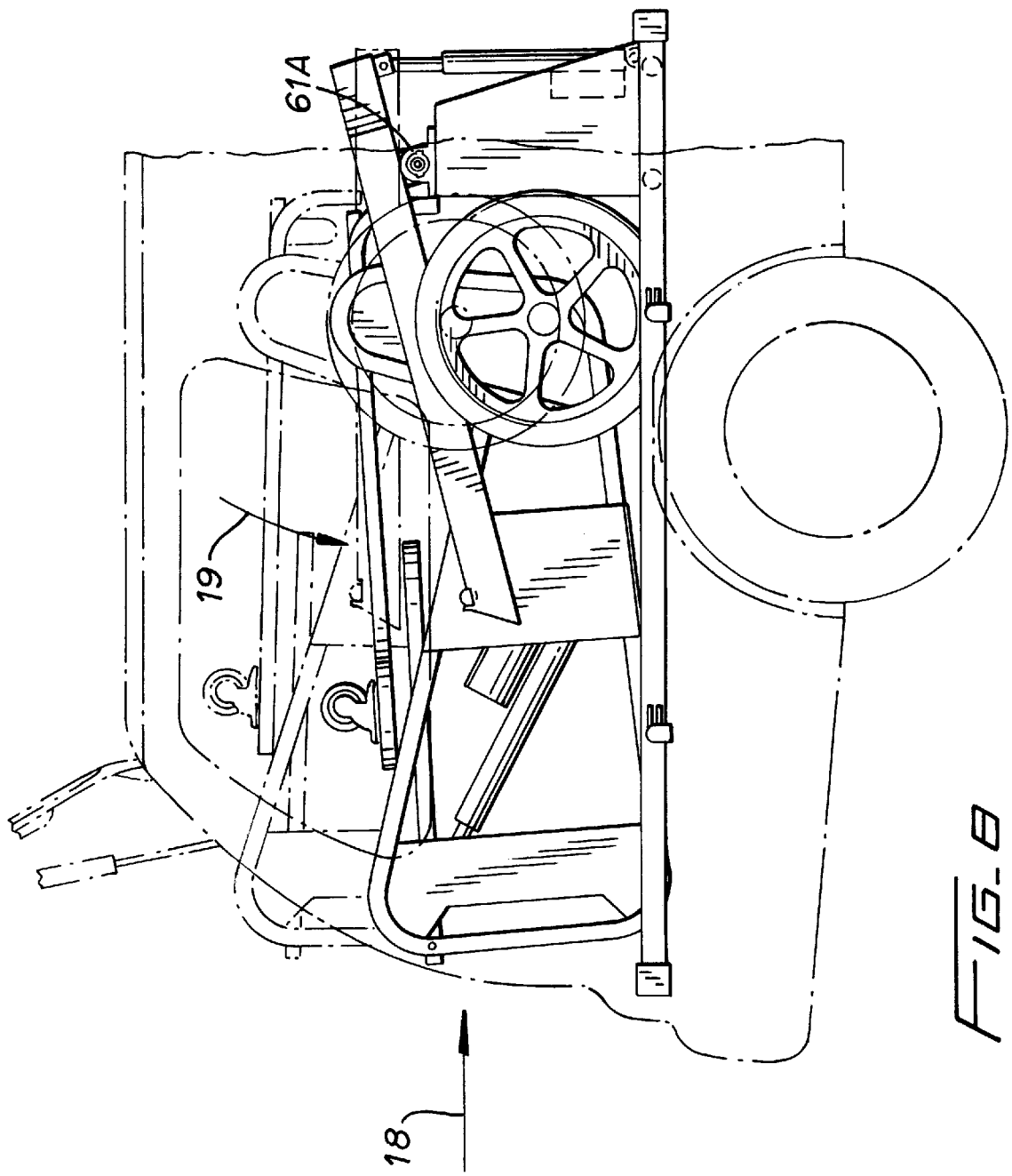
FIG. 8 is a side elevational view of an equipment handling device in accordance with the present invention installed in a vehicle shown in phantom.

Referring now to FIGS. 7 and 8, in use the door of the vehicle 22 is opened to allow the carriage 46 to slide in the tracks 24 toward the open door to extend the yoke 50 out through the open door. The carriage 46 may be locked into place by a locking pin 68 (FIGS. 1, 2, and 5) to prevent the carriage 46 from sliding while the equipment 28 is lifted. Similar locking pins 68 may also be provided at other locations along the tracks 24. The yoke 50 is lowered by extending the extension cylinder 48 which causes the yoke 50 to pivot about the pivot coupling 60 and the end of the yoke 50 having grooves 62 to be lowered. Then, the lifting nubs 64 of the equipment 28 are positioned under the grooves 62 and the yoke 50 is raised by retracting the extension cylinder 48 which causes the yoke 50 to pivot about the pivot coupling 60, thereby engaging the lifting nubs 64 in the grooves 62 and lifting the equipment 28 up off the ground (arrow 16). As indicated by the arrows 17, when the equipment 28 is raised from the ground, it may be rotated to position the equipment 28 so that the longitudinal axis of the equipment is in a substantially horizontal position. Therefore, the greatest dimension of the equipment 28 is matched with the greatest dimension of the cargo area of the vehicle 22. Once the equipment is rotated, the locking pin 68 is released and the equipment 28 is pushed into the vehicle 22 (indicated by the arrow 18) such that the carriage 46 slides along the tracks 24. When the carriage 46 has been fully pushed into the vehicle 22, the yoke 50 may again be lowered (indicated by arrow 19) such that the equipment 28 rests on the floor 26 of the vehicle 22 for transport. The steps are reversed for unloading.

In one alternative embodiment of the invention, shown in FIGS. 9, 10, and 11, the carriage 46 is fitted with a yoke 80 having two parallel arms 82, a cross piece 83, a triangular extension 85, a central arm 86, and two grooves 88 for receiving lifting numbs 64 of the equipment 28. The central arm 86 is used to connect the yoke 80 to the extension cylinder 48. In this embodiment, the yoke 80 pivots on the pivot coupling 60 in a slightly different manner. While in the first embodiment, the yoke 50 raises the equipment 28 as the extension cylinder 48 is retracted (a first class lever), in the alternative embodiment, the yoke 80 raises the equipment 28 as the extension cylinder 48 is extended (a third class lever). The yoke 50 has a head 53 which the yoke 80 lacks and, therefore, the yoke 50 is larger than the yoke 80. Because a smaller yoke is used, the alternative embodiment allows the equipment handling device 20 to be installed in a more confined space than the first embodiment. However, the alternative embodiment requires the use of a more powerful (and thus more expensive) extension cylinder 48 to lift the same equipment 28 because of the different lever action employed. While either embodiment may effectuate the objectives of the invention, the embodiment using the yoke 50 is preferred if sufficient installation space is available.

As illustrated by the foregoing description and shown in the drawings, the present invention is more suitable as an equipment handling device than existing devices. The present invention overcomes the limitations and disadvantages of existing handling devices by utilizing an effective design that is capable of loading awkward weight, tall, but sensitive equipment into vehicles, is easy to operate and maintain, is adaptable to a wide variety of vehicles, can be installed with relatively minor modification of the vehicle, and is economically priced.

Although the invention has been shown herein and described in what is perceived to be the most practical and preferred embodiment, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

What is claimed is:

1. An equipment handling device for installation in a vehicle, said handling device comprising:

a track releasably mounted to said vehicle by a securing means, said track comprising a pair of channels formed to receive and retain a plurality of wheels such that said wheels are substantially prevented from lifting out of said channels but are free to roll along said channels, said track further comprising a front end member stabilizingly connecting said channels and a back end member stabilizingly connecting said channels;

a carriage having said plurality of wheels rotatably attached thereto, said carriage further comprising a pair of vertical support pieces stabilizingly connected by an extension cylinder mounting member and a front stability member, said carriage having a pivot coupling atop thereof;

a carriage retention device capable of preventing said carriage from rolling along said channels; and a yoke having a load portion, an effort portion, and a fulcrum portion, said fulcrum portion of said yoke pivotably attached to said carriage by said pivot coupling, said load portion of said yoke having an equipment receiving groove, said groove capable of receiving and supporting an equipment lifting nub on said equipment, said effort portion coupled to said extension cylinder mounting member of said carriage by an extension cylinder;

wherein said effort portion of said yoke is copied to said extension cylinder mounting member by said extension cylinder such that retracting said extension cylinder causes said load portion to rise by lowering said effort portion.

2. An equipment handling device for installation in a vehicle, said handling device comprising:

a track releasably mounted to said vehicle by a securing means, said track comprising a pair of channels formed to receive and retain a plurality of wheels such that said wheels are substantially prevented from lifting out of said channels but are free to roll along said channels, said track further comprising a front end member stabilizingly connecting said channels and a back end member stabilizingly connecting said channels;

a carriage having said plurality of wheels rotatably attached thereto, said carriage further comprising a pair of vertical support pieces stabilizingly connected by an extension cylinder mounting member and a front stability member, said carriage having a pivot coupling atop thereof;

a carriage retention device capable of preventing said carriage from rolling along said channels; and a yoke having a load portion, an effort portion, and a fulcrum portion, said fulcrum portion of said yoke pivotably attached to said carriage by said pivot coupling, said load portion of said yoke having an equipment receiving groove, said groove capable of receiving and supporting an equipment lifting nub formed on said equipment, said effort portion coupled to said extension cylinder mounting member of said carriage by an extension cylinder;

wherein said effort portion of said yoke is coupled to said extension cylinder mounting member by said extension cylinder such that extending said extension cylinder causes said load portion to rise by raising said effort portion.

3. An equipment handling device comprising:

a carriage having first and second upright supports each having a bottom and a top end, the upright supports coupled to each other by one or more stabilizing cross-members, the bottom end of each upright support having a plurality of wheels mounted thereto, the top end of the first upright support having a first gudgeon and the top end of the second upright support having a second gudgeon;

a yoke having a head portion with a first pin for being inserted into the first gudgeon and a second pin for being inserted into the second gudgeon, a pair of substantially parallel arms coupled to the head portion;

an actuator having a first end coupled to the carriage and a second end coupled to the head portion of the yoke, the actuator operable to cause the yoke to pivot; and a pair of tracks consisting of a first track and a second track, each track capable of being releasably mounted to a vehicle, the first track for receiving and retaining the plurality of wheels on the first upright support and the second track for receiving the plurality of wheels on the second upright support.

4. An equipment handling device comprising:

a single carriage having first and second upright supports each having a bottom and a top end, the upright supports coupled to each other by one or more cross-members, the bottom end of each upright support having a plurality of wheels mounted thereto, the top end of the first upright support having a first pivot coupling and the top end of the second upright support having a second pivot coupling;

a non-jointed yoke having a head portion mounted on the first and second pivot couplings, an effort portion, and a load portion, the load portion having an equipment engaging mechanism and a pair of substantially parallel arms coupled to the head portion;

an actuator having a first end coupled to the carriage and a second end coupled to the head portion of the yoke, the actuator operable to cause the yoke to pivot; and a pair of tracks consisting of a first track and a second track, each track capable of being releasably mounted to a vehicle, the first track for receiving and retaining the plurality of wheels on the first upright support and the second track for receiving the plurality of wheels on the second upright support.

5. The equipment handling device in claim 4, wherein said actuator is coupled to said effort portion of said yoke such that retracting said actuator causes said load portion to rise by lowering said effort portion.

6. The equipment handling device in claim 4, wherein said actuator is coupled to said effort portion of said yoke such that extending said actuator causes said load portion of said lifting arm to rise by lifting said effort portion.

* * * * *